United States Patent
Morris et al.

(10) Patent No.: US 11,070,299 B2
(45) Date of Patent: Jul. 20, 2021

(54) OPTICAL LINK MANAGEMENT

(71) Applicant: Magseis FF LLC, Houston, TX (US)

(72) Inventors: Michael Morris, Sugar Land, TX (US); Thomas O'Brien, Sugar Land, TX (US); Philip Navratil, Houston, TX (US)

(73) Assignee: MAGSEIS FF LLC, Houston, TX (US)

( * ) Notice: Subject to any disclaimer, the term of this patent is extended or adjusted under 35 U.S.C. 154(b) by 0 days.

(21) Appl. No.: 16/814,739

(22) Filed: Mar. 10, 2020

(65) Prior Publication Data
US 2020/0213015 A1 Jul. 2, 2020

Related U.S. Application Data

(63) Continuation of application No. 16/594,974, filed on Oct. 7, 2019, now Pat. No. 10,608,754, which is a
(Continued)

(51) Int. Cl.
*H04B 13/02* (2006.01)
*H04B 10/11* (2013.01)
(Continued)

(52) U.S. Cl.
CPC ............. *H04B 13/02* (2013.01); *G01V 1/226* (2013.01); *H04B 10/11* (2013.01); *H04B 10/112* (2013.01);
(Continued)

(58) Field of Classification Search
CPC ...... H04B 13/02; H04B 10/11; H04B 10/112; H04B 10/50; H04B 10/0001; H04B 10/80;
(Continued)

(56) References Cited

U.S. PATENT DOCUMENTS 5,623,355 A * 4/1997 Olsen .................. H01S 5/06835
398/162
5,706,112 A * 1/1998 Morita ................. H04B 10/503
340/3.1
(Continued)

FOREIGN PATENT DOCUMENTS

EP 0 641 095 3/1995
GB 2 511 938 7/2016

OTHER PUBLICATIONS

Examination Report for EP 17722285.8 dated Feb. 19, 2019 (9 pages).
(Continued)

*Primary Examiner* — Mina M Shalaby
(74) *Attorney, Agent, or Firm* — Foley & Lardner LLP

(57) ABSTRACT

The present disclosure provides optical link management in a marine seismic environment. A first device can transmit, to a second device, a first optical transmission at a first output level. The first optical transmission can include a first packet corresponding to a network protocol. The first device can determine that the second device failed to receive the first packet via the first optical transmission. The first device can transmit, responsive to failure of the first optical transmission, a second optical transmission at a second output level different than the first output level. The second optical transmission can include a second packet corresponding to the network protocol. The first device can identify that the second packet was successfully received by the second link manager agent. The first device can establish, responsive to the identification that the second packet was successfully received, the second output level as a transmission output level for the first device.

18 Claims, 5 Drawing Sheets

Related U.S. Application Data continuation of application No. 16/451,887, filed on Jun. 25, 2019, now Pat. No. 10,476,606, which is a continuation of application No. 16/297,112, filed on Mar. 8, 2019, now Pat. No. 10,374,727, which is a continuation of application No. 15/286,834, filed on Oct. 6, 2016, now Pat. No. 10,270,541.

(60) Provisional application No. 62/328,417, filed on Apr. 27, 2016.

(51) Int. Cl.
| | | |
|---|---|---|
| *G01V 1/22* | (2006.01) | |
| *H04B 10/112* | (2013.01) | |
| *H04B 10/50* | (2013.01) | |
| *H04L 1/00* | (2006.01) | |
| *H04L 1/08* | (2006.01) | |
| *G01V 1/38* | (2006.01) | |
| *H04B 10/80* | (2013.01) | |
| *G08C 23/04* | (2006.01) | |

(52) U.S. Cl.
CPC ............ *H04B 10/50* (2013.01); *H04L 1/0001* (2013.01); *H04L 1/08* (2013.01); *G01V 1/3808* (2013.01); *G08C 23/04* (2013.01); *H04B 10/80* (2013.01)

(58) Field of Classification Search
CPC ........ G01V 1/226; G01V 1/3808; H04L 1/08; H04L 1/0001; G08C 23/04
See application file for complete search history.

(56) References Cited

U.S. PATENT DOCUMENTS

| | | | | |
|---|---|---|---|---|
| 6,970,651 | B1* | 11/2005 | Schuster | H04B 10/1121 398/118 |
| 7,113,708 | B1* | 9/2006 | Creaney | H04B 10/07955 398/140 |
| 7,248,797 | B2* | 7/2007 | Forsberg | H04B 10/077 398/15 |
| 8,649,690 | B2* | 2/2014 | Gehrke | H04B 10/07955 398/136 |
| 2003/0113118 | A1* | 6/2003 | Bartur | H04B 10/40 398/139 |
| 2004/0179855 | A1* | 9/2004 | Harada | H04J 14/0282 398/197 |
| 2004/0179885 | A1 | 9/2004 | Adkins et al. | |
| 2005/0020279 | A1* | 1/2005 | Markhovsky | G01S 5/12 455/456.1 |
| 2005/0201761 | A1* | 9/2005 | Bartur | H04B 10/071 398/197 |
| 2005/0205760 | A1* | 9/2005 | Griffioen | H04B 10/66 250/214.1 |
| 2006/0012476 | A1* | 1/2006 | Markhovsky | G01S 13/74 340/539.32 |
| 2006/0286931 | A1 | 12/2006 | Rhodes et al. | |
| 2007/0177879 | A1* | 8/2007 | Hsieh | H04B 10/40 398/151 |
| 2008/0166119 | A1* | 7/2008 | Ryu | H04Q 11/0067 398/17 |
| 2012/0263460 | A1* | 10/2012 | Movassaghi | H04B 10/40 398/38 |
| 2014/0086008 | A1 | 3/2014 | Pharris et al. | |
| 2014/0093233 | A1* | 4/2014 | Gao | H04B 10/564 398/16 |
| 2014/0248058 | A1 | 9/2014 | Simpson et al. | |
| 2014/0341584 | A1* | 11/2014 | Hopewell | H04B 10/50 398/104 |
| 2014/0363166 | A1 | 12/2014 | Lacovara | |
| 2015/0171968 | A1* | 6/2015 | Featherston | H04B 10/1123 398/118 |
| 2015/0358087 | A1* | 12/2015 | Pavlas | H04B 10/508 398/182 |
| 2016/0094298 | A1 | 3/2016 | Isfeldt et al. | |
| 2017/0063450 | A1* | 3/2017 | Paulussen | H04B 10/07955 |

OTHER PUBLICATIONS

Final Office Action for U.S. Appl. No. 15/286,834 dated Nov. 20, 2017 (18 pages).
First Office Action for CN 201780002568.9 dated Jan. 6, 2020 (12 pages).
International Preliminary Report on Patentability for PCT/US2017/029414 dated Nov. 8, 2018 (10 pages).
International Search Report and Written Opinion for PCT/US2017/0029414 dated Jun. 26, 2017 (17 pages).
Non-Final Office Action for U.S. Appl. No. 15/286,834 dated Jun. 23, 2017 (16 pages).
Non-Final Office Action for U.S. Appl. No. 15/286,834 dated Jun. 29, 2018 (17 pages).
Notice of Allowance for U.S. Appl. No. 15/286,834 dated Dec. 5, 2018 (6 pages).
Notice of Allowance for U.S. Appl. No. 16/297,112 dated May 30, 2019 (2 pages).
Notice of Allowance for U.S. Appl. No. 16/297,112 dated Apr. 9, 2019 (10 pages).
Notice of Allowance for U.S. Appl. No. 16/451,887 dated Jul. 26, 2019 (9 pages).
Notice of Allowance for U.S. Appl. No. 16/594,974 dated Nov. 18, 2019 (17 pages).
Notice of Allowance for U.S. Appl. No. 16/594,974 dated Jan. 23, 2020 (2 pages).
Notice of Allowance for U.S. Appl. No. 16/594,974 dated Feb. 5, 2020 (2 pages).
Examination Report for ID PID201708891 dated Sep. 15, 2020 (4 pages).
Notification to Grant Patent Right for Invention for CN Appln. Ser. No. 201780002568.9 dated Sep. 2, 2020 (6 pages).
Examination Report for EP 20155320.3 dated May 27, 2020 (4 pages).
Extended European Search Report for EP 20155320.3 dated Oct. 19, 2020 (7 pages).

* cited by examiner

400

OPTICAL LINK MANAGEMENT

CROSS-REFERENCE TO RELATED APPLICATION

This application claims the benefit of priority under 35 U.S.C. § 120 as a continuation of U.S. patent application Ser. No. 16/594,974, filed Oct. 7, 2019, which claims the benefit of priority under U.S.C. § 120 as a continuation of U.S. patent application Ser. No. 16/451,887, filed Jun. 25, 2019, which claims the benefit of priority under 35 U.S.C. § 120 as a continuation of U.S. patent application Ser. No. 16/297,112, filed Mar. 8, 2019 and issued as U.S. Pat. No. 10,374,727, which claims the benefit of priority under 35 U.S.C. § 120 as a continuation of U.S. patent application Ser. No. 15/286,834, filed Oct. 6, 2016 and issued as U.S. Pat. No. 10,270,541, which claims the benefit of priority under 35 U.S.C. § 119 of U.S. Provisional Patent Application No. 62/328,417 filed Apr. 27, 2016, each of which is incorporated by reference herein in its entirety.

BACKGROUND

Seismic data may be evaluated to obtain information about subsurface features. The information can indicate geological profiles of a subsurface portion of earth, such as salt domes, bedrock, or stratigraphic traps, and can be interpreted to indicate a possible presence or absence of minerals, hydrocarbons, metals, or other elements or deposits. Devices can communicate the seismic data using a communication link. However, due to environmental variables, it may be challenging to manage the communication link between the devices.

SUMMARY

The present disclosure is generally directed to systems and methods configured with techniques to manage an optical communications link in a free-space. Managing an optical communications link can include or refer to establishing the optical communications link between two or more devices, and maintaining the optical communications link between the two or more devices.

At least one aspect is directed to a system to manage an optical link to communicate data via an aqueous medium. The system can include a first link manager agent of a first device. The first link manager agent can transmit, to a second link manager agent of a seismic data acquisition device, a first optical transmission at a first output level. The first optical transmission can include a first packet corresponding to a network protocol. The first link manager agent can determine that the second link manager agent failed to receive the first packet via the first optical transmission. The first link manager agent can transmit, responsive to failure of the first optical transmission, a second optical transmission at a second output level different, greater than or less than the first output level. The second optical transmission can include a second packet corresponding to the network protocol. The first link manager agent can identify that the second packet was successfully received by the second link manager agent. The first link manager agent can establish, responsive to the identification that the second packet was successfully received, the second output level as a transmission output level for the seismic data acquisition device.

At least one aspect is directed to a method of managing an optical link to communicate data via an aqueous medium. The method can include a first link manager agent of a first device transmitting a first optical transmission at a first output level to a second link manager agent of a seismic data acquisition device. The first optical transmission can include a first packet corresponding to a network protocol. The method can include the first link manager agent determining that the second link manager agent failed to receive the first packet via the first optical transmission. The method can include the first link manager agent transmitting, responsive to failure of the first optical transmission, a second optical transmission at a second output level different, greater than or less than the first output level. The second optical transmission can include a second packet corresponding to the network protocol. The method can include the first link manager agent identifying that the second packet was successfully received by the second link manager agent. The method can include the first link manager agent establishing, responsive to determining that the second packet was successfully received, the second output level as a transmitting output level for the seismic data acquisition device.

At least one aspect is directed to a method of managing an optical link to communicate data via an aqueous medium. The method can include a first link manager agent of a device identifying an optical link established with a first output level between the device and a second link manager agent of a seismic data acquisition device. The method can include the first link manager agent transmitting, to the second link manager agent of the seismic data acquisition device, a first optical transmission at a first output level. The first optical transmission can include a first packet corresponding to a network protocol. The method can include the first link manager agent determining that the second link manager agent failed to receive the first packet via the first optical transmission. The method can include the first link manager agent transmitting, responsive to failure of the first optical transmission, a second optical signal at a second output level greater than the first output level. The second optical transmission can include a second packet corresponding to the network protocol. The method can include the first link manager agent identifying that the second packet was successfully received by the second link manager agent. The method can include the first link manager agent adjusting, responsive to a determination of successful receipt of the second packet, the optical link to use the second output level for optical transmissions between the device and the seismic data acquisition device.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
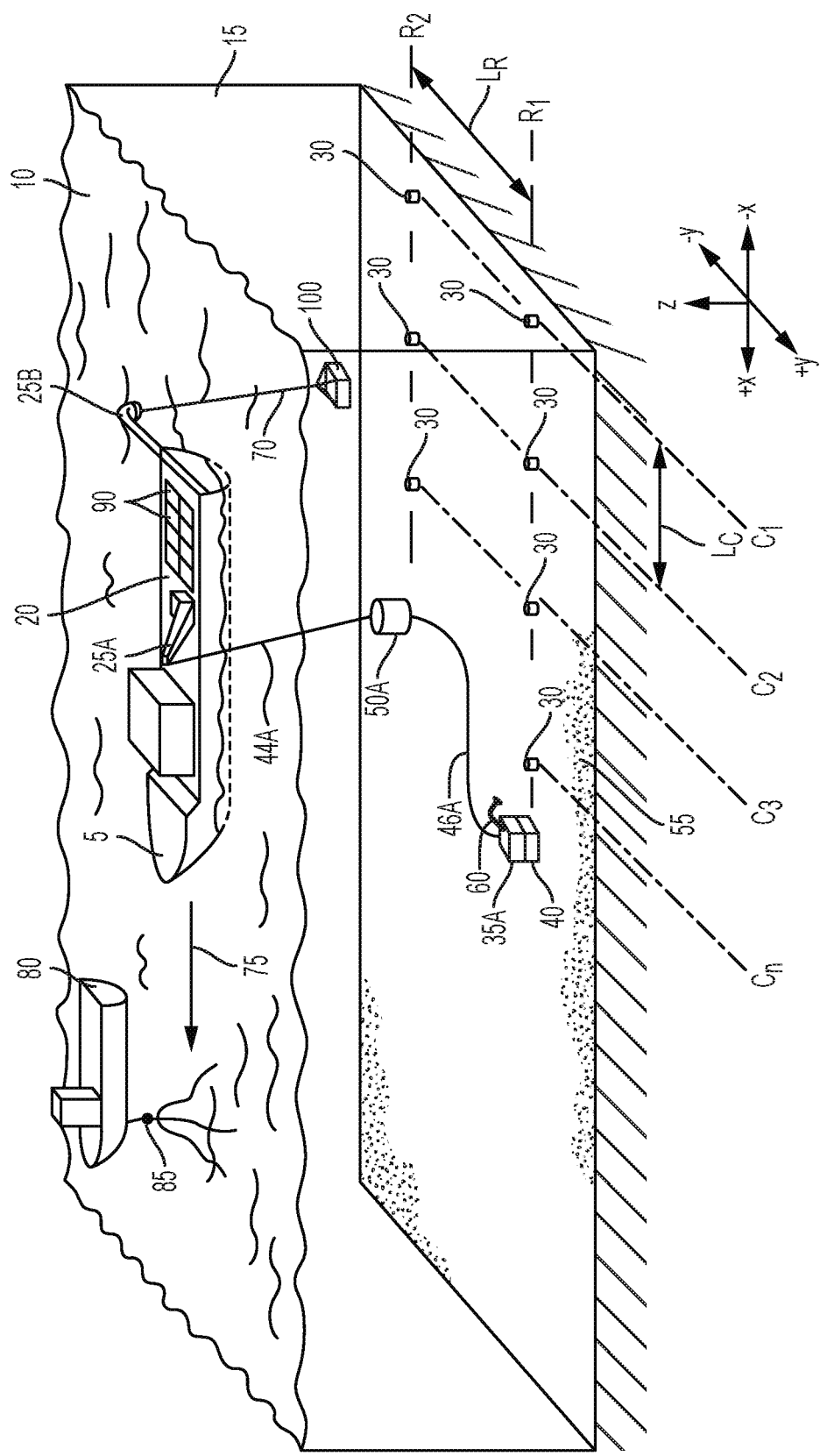
FIG. 1 depicts an isometric schematic view of an embodiment of a seismic operation in deep water.

The present disclosure is directed to systems and methods for managing an optical communications link in free-space.

Managing an optical communications link can include or refer to establishing the optical communications link between two or more devices, and maintaining the optical communications link between the two or more devices. A communication link in free-space can refer to, for example, any communication that is, at least in part, not conveyed via a fiber, wire or other physical conduit. For example, a communication link in free-space can include an optical communication through a medium such as air or an ocean water, sea water, lake water or other aqueous medium or fluid.

To manage an optical communication link in free-space, the present disclosure provides devices including a link manager agent that can manage an optical link. The devices can be configured with a half-duplex technique that allows an optical transmitter and receiver pair to unilaterally identify a gain level that allows the optical transmitter and optical receiver to parse or process optical signals to retrieve the information carried by the optical signals. The devices can establish the communication link using a lower level link management technique to determine whether all the bits in a frame were received. The devices can be further configured to maintain the communication link using a higher level link management technique to determine whether there were any errors in a data packet and, if so, re-request the data packet.

Systems and methods of the present disclosure can use non-standard bit rates, such as 320 megabits per second (mbps). The system can use or select a bit rate based on a clock control rate and circuit design of one or more components of the devices.

For example, a device including the link manager agent can receive an initial wake-up signal in the form of an optical communication, such as light, light pulse, illumination, luminescence or other visual indicator. The device can include a receiver automatic gain control ("AGC") unit that can determine whether the incoming wake-up signal (or optical signals or communications received subsequent to the wake-up signal) is above or below a threshold (e.g., an intensity or strength of the optical signal is above or below a predetermined threshold). If the receiver AGC unit determines the signal is below the threshold (e.g., having an intensity below the threshold), such as too low to reliable determine the information carried via the optical signal, then the receiver AGC unit can increase a gain to amplify the signal. If the receiver AGC unit determines the signal is too bright (e.g., having an intensity above the threshold), the receiver AGC unit can decrease or reduce the gain. The receiver AGC can provide self-preservation for one or more component of the device to prevent or reduce damage caused to hardware, such as optical components of the device, fiber optics of the device, or other photoelectric or electronic components. The self-preservation can also reduce heat output by components, such as a photodetector or battery that is powering one or more component of the device.

The receiver AGC unit, responsive to receiving the initial wake-up signal instructing the device to wake-up or enter an on state, can increase a gain of the device until the device can detect the optical signal and retrieve information carried by the optical signal.

In some cases, a first device can have a first link manager agent and a second device can have a second link manager agent. The link manager agents can control one or more parameters or components of their respective device, such as an optical transmitter, optical receiver, transmit output level, or AGC unit. For example, to establish and maintain the optical communications link in free space, the first link manager agent can select a transmit output level for an optical transmitter based on one or more variables associated with an optical receiver that is to receive the output transmitted by the optical transmitter. However, in free space optical systems, one or more variables can affect the optical communications link or the process of selecting a transmit output level, such as absorption, scattering, alignment, distance between the optical transmitter and the corresponding optical receiver, or motion related to the devices or link manager agents. Thus, to produce a robust optical communications link, the link manager agent can evaluate various information.

The optical communication link can be used to transfer, harvest, collect or otherwise communicate data, including data related to oilfield operations, oil exploration, hydrocarbon production, hydrocarbon exploration, marine seismic activity, or ocean field operations. The data can be transferred to an underwater vehicle from a sensor via the optical communications link. The sensor can include a seismic sensor device or other sensors or devices such as environmental sensors that detect pressure, temperature, flow, vibration, power source condition, water motion, or other environmental factors. The data can be transferred, harvested, or otherwise collected using the optical communications link based on a time interval (e.g., every 1 hour, 2 hours, 5 hours, 12 hours, 24 hours, 48 hours, or 72 hours), responsive to an event (e.g., after an acoustic shot), or responsive to an instruction to collect the information.

FIG. 1 is an isometric schematic view that illustrates a non-limiting example of an embodiment of a seismic operation. The seismic operation can be in deep water and facilitated by a first marine vessel 5. The first vessel 5 is positioned on a surface 10 of a water column 15 and includes a deck 20 which supports operational equipment. At least a portion of the deck 20 includes space for a plurality of sensor device racks 90 where seismic sensor devices are stored. The sensor device racks 90 may also include data retrieval devices or sensor recharging devices.

The deck 20 also includes one or more cranes 25A, 25B attached thereto to facilitate transfer of at least a portion of the operational equipment, such as an ROV or seismic sensor devices, from the deck 20 to the water column 15. For example, a crane 25A coupled to the deck 20 is configured to lower and raise an ROV 35A, which transfers and positions one or more sensor devices 30 on a seabed 55. The seabed 55 can include a lakebed 55, ocean floor 55, or earth 55. The ROV 35A can be wireless. The ROV 35A can be self-contained. The ROV 35A can be coupled to the first vessel 5 by, for example, a tether 46A and an umbilical cable 44A that provides power, communications, and control to the ROV 35A. A tether management system (TMS) 50A can be coupled between the umbilical cable 44A and the tether 46A. The TMS 50A may be utilized as an intermediary, subsurface platform from which to operate the ROV 35A. In some cases, for ROV 35A operations at or near the seabed 55, the TMS 50A can be positioned approximately 50 feet above seabed 55 and can pay out tether 46A for ROV 35A to move freely above seabed 55 to position and transfer seismic sensor devices 30 thereon. Sensor device 30 can include a seismic sensor device or non-seismic sensor devices, as well as combinations thereof.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The crane 25B can be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 can be configured as a sensor device storage rack for transfer of sensor devices 30 from the first vessel 5 to the ROV 35A, and from the ROV 35A to the first vessel 5. The cable 70 may be an umbilical, a tether, a cord, a wire, a rope, and the like, that is configured to support the transfer device 100.

The ROV 35A can include a seismic sensor device storage compartment 40 that is configured to store one or more seismic sensor devices 30 therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. The seismic sensor devices 30 may be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. In some embodiments, the seismic sensor devices 30 may be deployed and retrieved from the storage compartment 40 by a robotic device 60, such as a robotic arm, an end effector or a manipulator, disposed on the ROV 35A.

The seismic sensor device 30 may include a sensor in an oil production field, and can be a seismic data acquisition unit or node. The seismic sensor device 30 can record seismic data. Seismic data can include, for example, data collected by the one or more sensors of the device 30 such as trace data, force data, motion data, pressure data, vibration data, electrical current or voltage information indicative of force or pressure, temperature data, or tilt information. The seismic sensor device 30 may include one or more of at least one motion detector such as a geophone, at least one pressure detector such as a hydrophone, at least one power source (e.g., a battery, external solar panel), at least one clock, at least one tilt meter, at least one environmental sensor, at least one seismic data recorder, at least one global positioning system sensor, at least one wireless or wired transmitter, at least one wireless or wired receiver, at least one wireless or wired transceiver, or at least one processor. The seismic sensor device 30 may be a self-contained unit such that all electronic connections are within the seismic sensor device 30, or one or more components can be external to the seismic sensor device 30. During recording, the seismic sensor device 30 may operate in a self-contained manner such that the node does not require external communication or control. The seismic sensor device 30 may include several geophones and hydrophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

The device 30 can include or refer to other types of sensors or units used in oilfield or hydrocarbon operations, production or exploration. The device 30 can record, detector, collect or obtain data related to oil field production or hydrocarbon production. The device 30 can collect data related to oil field production or hydrocarbon production that includes, for example, pressure information (e.g., pressure of oil or other fluid flowing through a pipe), temperature data (e.g., ambient temperature, temperature of a fluid flowing through a pipe, or temperature of a component or device), current flow (e.g., water flow or rate in an aqueous medium, river or ocean).

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A can utilize commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. Reloading of the storage compartment 40 can be provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 is reloaded. This process may repeat as until a desired number of seismic sensor devices 30 have been deployed.

Using the transfer device 100 to reload the ROV 35A at a subsurface location can reduce the time required to place the seismic sensor devices 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

The sensor devices 30 can be placed on seabed 55 for an extended duration, such as 1 year, 2 years, 3 years, 4 years, 5 years, or more. Data, such as seismic data or status data, can be retrieved from the sensor devices 30 while they are located on the seabed 55 using wireless transmission techniques, such as optical links.

In a retrieval operation, the ROV 35A can utilize commands from personnel on the first vessel 5 to retrieve each seismic sensor device 30 that was previously placed on seabed 55. The retrieved seismic sensor devices 30 are placed into the storage compartment 40 of the ROV 35A. In some embodiments, the ROV 35A may be sequentially positioned adjacent each seismic sensor device 30 on the seabed 55 and the seismic sensor devices 30 are rolled, conveyed, or otherwise moved from the seabed 55 to the storage compartment 40. In some embodiments, the seismic sensor devices 30 may be retrieved from the seabed 55 by a robotic device 60 disposed on the ROV 35A.

Once the storage compartment 40 is full, contains a pre-determined number of seismic sensor devices 30, or is otherwise ready, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

The first vessel 5 may travel in a first direction 75, such as in the +X direction, which may be a compass heading or other linear or predetermined direction. The first direction 75 may also account for or include drift caused by wave action, current(s) or wind speed and direction. In one embodiment, the plurality of seismic sensor devices 30 are placed on the seabed 55 in selected locations, such as a plurality of rows Rn in the X direction (R1 and R2 are shown) or columns Cn in the Y direction (C1-Cn are shown), wherein n equals an integer. In one embodiment, the rows Rn and columns Cn define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. The distances LR and LC may be substantially equal and may include dimensions between about 60 meters to about 400 meters, or greater. The distance between adjacent seismic sensor devices 30 may be pre-determined or result from topography of the seabed 55 as described above.

The first vessel 5 can be operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. In this embodiment, wherein two receiver lines (rows R1 and R2) are being laid, the first vessel includes a first speed of between about 0.2 knots and about 0.6 knots. In other embodiments, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 is used to provide a source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 may be much shorter than the deployment time of the second receiver line. This causes a lag time in the seismic survey as the second vessel 80 sits idle while the first vessel 5 is completing the second receiver line.

The first vessel 5 can use one ROV 35A to lay sensor devices to form a first set of two receiver lines (rows R1 and R2) in any number of columns, which may produce a length of each receiver line of up to and including several miles. The two receiver lines (rows R1 and R2) can be parallel or substantially parallel (e.g., less than 1 degree, 2 degrees, 0.5 degrees, 0.1 degrees, or 5 degrees). When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance LR) between sensor devices 30.

Figure 2:
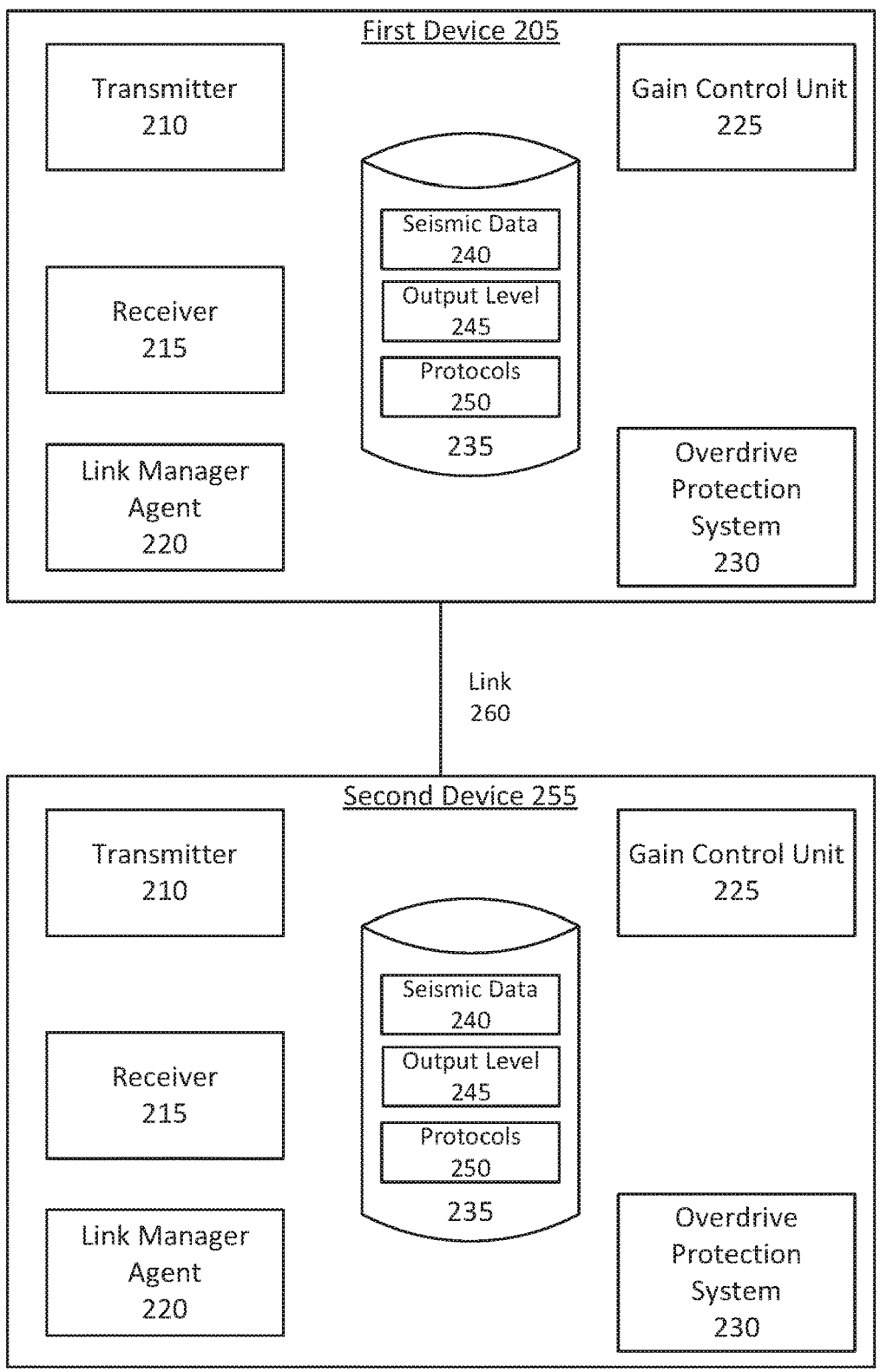
FIG. 2 is an embodiment of a system to manage an optical communication link in free-space.

FIG. 2 is an embodiment of a system to manage an optical communication link in free-space. The system 200 can include one or more devices 205 and 255. The devices 205 and 255 can include or refer to a seismic data acquisition device 30, seismic sensor device 30, an ocean bottom seismic data acquisition unit, seismic sensor device 30, a geophone, a hydrophone, ROV 35A, autonomous underwater vehicle 35A, or underwater vehicle 35A. The system 200 can include one or more component, element or functionality of system 300 depicted in FIG. 3.

The devices 205 and 255 can include one or more of at least one transmitter 210, at least one receiver 215, at least one link manager agent 220, at least one gain control unit 225, at least one overdrive protection system 230, or at least one data storage device 235. The data storage device 235 can include memory, storage, a database, data structures, or a file repository. The data storage device 235 can store or maintain one or more of seismic data 240, output level 245, or protocols 250. The transmitter 210, receiver 215, link manager agent 220, gain control unit 225, overdrive protection system 230 and data storage device 235 can communicate or interface with one another directly (e.g., via wired or wireless communication) or indirectly (e.g., via another component of system 200). The system 200 and its components, including device 205 and 255, may include hardware elements, such as one or more processors, logic devices, or circuits. For example, the first device 205 can include one or more subcomponents to transmit a first optical transmission at a first output level, determine that a second link manager agent failed to receive the first packet via the first optical transmission, transmit a second optical transmission at a second output level different, less than or greater than the first output level, identify that the second packet was successfully received by the second link manager agent, and establish the second output level as a transmission output level for the first seismic data acquisition device.

The devices 205 and 255 can include at least one logic device such as a computing device having a processor to communicate via a communication link 260. The devices 205 and 255 can include a network interface, field programmable gate array, or other components or logic structures to manage an optical link between the devices. The communication link 260 can be a wireless communication link, such as an optical link in free-space.

The device 205 or 255 can include a transmitter 210. The transmitter 210 can include an optical transmitter. The optical transmitter 210 can include, for example, a light source such as a laser light source, solid state laser, vertical cavity surface-emitting lasers, light emitting diode ("LED"), lamp, fluorescent light source, or incandescent light source. The optical transmitter 210 can include one or more lenses configured to form a light beam from the light emitted from the light source. The optical transmitter 210 can include electronic circuitry or a driver configured to provide power to the light source to transmit light with one or more parameters. Parameters can include, for example, frequency, wavelength, intensity of light or output level, pulse rate, burst rate, or color. The optical transmitter 210 can convert electrical signal into an optical form, and transmit the generated optical form or signal into free-space. In some cases, the optical transmitter 210 can include an optical source, electrical pulse generator or optical modulator. The optical transmitter 210 can be positioned within the device 205 or adjacent to the device 205 or on an external surface of device 205 such that light emitted from the optical transmitter can travel through free-space from the first device 205 to the second device 255.

The device 205 or 255 can include a receiver 215. The receiver 215 can include an optical receiver 215 such as a photodetector or other component configured to receive light and convert or translate the received light into an electrical signal. The receiver 215 can include a photodetector or photodiode that loses electrons when struck by a photon moving at a predetermined wavelength. When the photodiode is struck by light energy, electrons are released to create an electric charge that the receiver 215 can then amplify. When the signal is sufficiently amplified, the receiver 215 can translate the signal into electrical information, such as digital ones and zeros.

The device 205 or 255 can include a link manager agent 220. The link manager agent can include one or more component or functionality of system 300 depicted in FIG. 3, including, for example, link manager agent 305 network stacks 340 or 365, or FPGAs 345 or 370. The link manager agent 220 can instruct the optical transmitter 210 to transmit an optical transmission at an output level (e.g., light intensity level). The link manager 220 can encode information into an electrical signal and provide the electrical signal to the optical transmitter 210 to translate the electrical signal into light and transmit the light through free-space. The link manager agent 220 can encode information such as a data packet. The data packet can be encoded in accordance with a protocol 250 stored in data storage 235. The protocol 250 can include any type of network protocol or other data transmission protocol. The protocol 250 used to encode the information or create a data structure for the data packet can include, for example, a user datagram protocol (UDP), Internet protocol, transmission control protocol (TCP), or stream control transmission protocol (SCTP). For example, the data packet can include a structure that corresponds to a user datagram protocol, such as a number, type or size of header fields or payload. The link manager agent 220 can use a protocol 250 without handshaking to perform error-checking and correction to avoid this processing at the network interface level. UDP, for example, can permit individual packets to be dropped.

The first device 205 can transmit the first optical transmission at a first output level. The first output level can refer to a default or initial output level. The default output level can be stored in an output level data structure or data field stored in data storage device 235. Default output levels can include an output level of a parameter such as light intensity. Output levels 245 can be stored in data storage device 235 as a scale (e.g., low, medium, high), grade (e.g., A, B, C, D), or numeric scale (e.g., 1 to 10; 1 to 100 or other numeric scale where the ends of the scale represent high or low). The output level data structure 245 can include a table with multiple output levels, such as a first output level, second output level, third output level, fourth output level, or fifth output level. These output levels can map to an intensity level or electric current or voltage level, power level, or other level. In some cases, the output level 245 can include numeric light intensity values or luminous intensity (e.g., candela, optical power per unit area, or Watts per square meter) or electrical signal (e.g., voltage or current) values. The output level can increase or decrease based on a pattern or wave shape, such as a triangle wave pattern, sinusoidal wave, ramp function, or other wave shape or pattern.

The first device 205 can transmit the first optical transmission to free-space or towards a second device 255. For example, the first device 205 can be included with an underwater vehicle such as an ROV 35A, AUV, or vessel. The second device 205 can be included with a seismic sensor device 30. The first device 205, upon transmitting the first optical transmission, can determine whether the second device 255 received the first optical transmission. The first device 205 can determine whether the second device 255 received the data packet or other information carried by, or encoded in, the first optical transmission. In some cases, the first device 205 can determine that the second device 255 failed to receive the data packet in the first optical transmission. In some cases, the first device 205 can determine that the second device 255 successfully received the data packet carried via the optical transmission.

The first device 205 (or link manager agent 220) can determine that the second device 255 failed to receive the first packet via the first optical transmission. The first link manager agent 220 of the first device 205 can determine that the second link manager agent failed to receive the first packet via the first optical transmission based on information or light received by the first device 205 from the second device 255. For example, the second device 255 can output optical transmission at a predetermined interval, time period, or pulse repetition frequency or pulse repetition interval (e.g., 0.1 milliseconds, 0.2 milliseconds, 0.5 milliseconds, 10 milliseconds, 1 second or some other time interval). The second device 255 can transmit the optical transmissions at a default or initial time interval which can indicate, to the first device 205, that the second device did not successfully receive the data packet in the first optical transmission. If the second device 255 successfully received the first data packet in the first optical transmission, the second device 255 can alter a parameter of the optical transmissions, such as a pulse repetition frequency.

The first device 205 can detect a pulse repetition interval or other time interval of the optical transmission sent by the second device 255. The first device 205 can determine that the pulse repetition interval corresponds to a predetermined pulse repetition interval that indicates that the second device 255 did not successfully receive one or more data packet sent via the first optical transmission. Detecting a pulse repetition interval of light pulses can be different from successfully receiving a data packet. For example, the optical receiver 215 can detect light and translate the light to an electronic signal. The device 205 can compare a characteristic (e.g., voltage, current, or power) of the electronic signal with a threshold. If, responsive to the comparison, the first device 205 determines that the electronic signal is greater than the threshold, the first device 205 can determine that an optical transmission was received. However, even though the first device 205 determines than an optical transmission was received, the output level of the optical transmission might be too low to successfully interpret or parse one or more data packets or other information carried by the optical transmission. For example, the intensity level of the optical transmission might be high enough to determine that an optical transmission was received, but not high enough to decipher or identify the bits carried via the optical transmission. While the first device 205 may not identify the data packet, the first device 205 can determine that an optical transmission was received and a pulse repetition interval or other parameter of the optical transmission. For example, the optical transmission can include 100 light bursts or pulses over a time interval of one second, thereby having a pulse repetition interval of 0.01 milliseconds or a pulse repetition frequency of 100 Hz. The first device 205 can determine that optical transmissions with a pulse repetition interval of 0.01 milliseconds is a default pulse repetition interval that indicates that the second device 255 did not successfully receive or determine the first one or more data packets transmitted in the first optical transmission.

If the link manager agent 220 of the first device 205 determines that the second device 255 did not successfully (or failed to) receive the one or more data packets carried via the first optical transmission, the link manager agent 220 can transmit a second optical transmission at a second output level. The second output level can be different, less than, or greater than the first output level. The second output level can be greater than the first output level if the first device 205 determines that the second device 255 failed to receive the data packets via the first optical transmission. For example, the link manager agent 220 of the first device 205 can instruct the optical transmitter 210 of the first device 205 to transmit the second optical transmission at a greater or lesser output level responsive to the second device 255 receiving, parsing, decoding, or otherwise obtaining the data packet carried via the first optical transmission. The second optical transmission can include a second data packet. The second data packet can be the same as the first data packet, or different from the first data packet. The second data packet can be encoded or generated using a protocol 250, such as the same protocol used to generate the first data packet, or a different protocol. In some cases, the second optical transmission can be the same or similar to the first optical transmission, except for an optical transmission parameter such as light intensity.

The link manager agent 220 of the first device 205 can determine whether the second device 255 (or link manager agent 220 of the second device 255) received the second optical transmission carrying a second one or more data packets. In some cases, the first device 205 can determine that the second device 255 did not, or failed to, successfully receive the second one or more packets of the second optical transmission. In some cases, the first device 205 can determine that the second device 255 successfully received the second one or more packets of the second optical transmission.

For example, the first device 205 can determine or identify that the second one or more packets were successfully received based on receiving optical transmissions from the second device 255 at a second predetermined time interval that is different from the first predetermined time interval. For example, the first time interval can include a pulse repetition interval of 0.01 milliseconds and the second time interval can include a pulse repetition interval different from 0.01 milliseconds, such as 0.02 milliseconds, 0.001 milliseconds, 0.002 milliseconds, or some other pulse repetition interval.

The second device 255 can use one or more techniques to indicate that the second device 255 successfully received a data packet, such as the one or more second data packets of the second optical transmission. For example, a link manager agent 220 of the second device 255 (or second link manager agent 220) can stop or cease transmitting optical transmissions for a time interval to indicate successful receipt of the second data packet. Stopping or ceasing the transmission of optical transmissions or signals can reduce energy consumption by the second device 255, while also indicating receipt of the second data packet. For example, the second device 255 (or link manager agent 220 of the second device 255) can disable the second optical transmitter 210 of the second device 255 responsive to the determination that the second link manager agent 220 successfully received the second packet. The second optical transmitter 210 of the second device 255 can be disabled to indicate to the first link manager agent 220 of the first device 205 that the second link manager agent 220 of the second device 255 successfully received the second packet. Disabling can refer to turning off, temporarily disabling, disengaging, or entering a standby mode.

Thus, and in some embodiments, the first device 205 and the second device 255 can utilize a half-duplex communication technique to identify that the second packet was successfully received by the second link manager agent. The half-duplex technique can refer to a technique in which the second device can indicate successful receipt of the data packet to the first device even though the first device may not have successfully received a data packet from the second device. For example, the first link manager agent 220 of the first device 205 may determine that the second packet was successfully received by the second link manager agent 220 of the second device 255 prior to the first link manager 220 of the first device 205 successfully receiving one or more data packets via one or more optical transmissions from the second link manager agent 220 of the second device 255.

The first link manager agent 220 of the first device 205 can establish a transmission output level for the first device 205. The first link manager agent 220 can establish the transmission output level responsive to identifying that one or more packets were successfully received by the second device 255. The link manager agent 220 can establish the transmission output level as the output level used to transmit the optical transmission carrying the data packets that were successfully received by the second device 255. For example, the first device 205 can transmit packets at an output level, determine the packets were successfully received, and then use the output level as the transmission output level for subsequent optical transmissions to the second device 255.

The first device 205 or second device 255 can include a gain control unit 225. The gain control unit 225 can include an AGC unit 225 such as a receiver AGC unit 225. The AGC unit 225 can adjust a gain level based on a measurement of at least one of an alternating current component or direct current component of an electric signal that translates one or more optical transmissions received by the first seismic data acquisition unit. The electrical signal can be generated by the optical receiver 215 responsive to receiving the one or more optical transmissions. For example, the AGC unit 225 can receive the electrical signals from the optical receiver 215, compare them with a threshold, and adjust the gain responsive to the threshold. The gain can refer to an amplification of the electrical signal. The amplified electrical signal can be communicated or provided to one or more components of the device 205, including, e.g., the link manager agent 220 or other process of the device 205 or 255.

In some cases, the device 205 or 255 can include an overdrive protection system 230. The overdrive protection system 230 can detect a signal level greater than or equal to a threshold, and instruct a component in the device 205 or 255 to disable or turn off responsive to detection of the signal level greater than or equal to the threshold. The overdrive protection system 230 can access one or more thresholds stored in data storage device 235, or be preconfigured with one or more thresholds. The overdrive protection system 230 can protect one or more components of device 205 or 255 from overheating. The overdrive protection system 230 can reduce battery usage or battery drain by reducing the amount of power consumed by the electrical components conveying the electrical signals. The overdrive protection system 230 can include a circuit or other component configured to monitor one or more components of the device 205 or 255. If the overdrive protection system 230 detects a dangerous condition, then the overdrive protection system 230 can turn off, trip, or disable the one or more components of the device 205 or 255. For example, the overdrive protection system 230 can detect a signal level greater than or equal to a threshold and, responsive to detection of the signal level greater than or equal to the threshold, turn off a receiver of the device.

Upon establishing the transmission output level, the first device 205 can establish the optical link 260. In some cases, the optical link 260 can be determined to be established upon both the first device 205 and the second device 255 identifying the transmission output level at which the other of the first device 205 or the second device 255 successfully receives and processes a data packet carried by an optical transmission.

The second device 225 can establish a transmission output level similar to the technique used by the first device 205 to establish the transmission output level. For example, the second link manager agent 220 of the second device 255 can transmit, to the first link manager agent 220 of the first device 205, a third optical transmission at a third output level. The third optical transmission can include a third packet corresponding to the network protocol. The second device 255 can determine that the first link manager agent 220 of the first device 205 failed to receive the third packet via the third optical transmission. The second device 255 can transmit, responsive to failure of the third optical transmission, a fourth optical signal at a fourth output level greater than the third output level. The fourth optical transmission can include a fourth packet corresponding to the network protocol. The second device 255 can identify that the fourth packet was successfully received by the first link manager agent. The second device 255 can establish responsive to a determination of successful receipt of the second packet and the fourth packet, an optical link 260 between the device 205 and the device 255.

Subsequent to establishing the optical link 260, the first device 205 or second device 255 can maintain the optical link 260. For example, the first link manager agent 220 of the first device 205 can provide, for inclusion in a third or subsequent optical transmission, status data used to maintain a level of quality of the optical link. The status data can include parameters or characteristics of the optical link 260 or a component, function or mode of the device 205 or 255. For example, the status data can include at least one of an automatic gain control value, receiver control setting, transmitter control setting, receiver clock lock, framing error, bit error, bit error rate, network packet errors received, distance measurement, or packet retries.

Subsequent to establishing the link, the first device 205 or second device 255 can adjust the established transmission output level based on the status information. The status information can indicate a level of quality of the optical link, such as poor, good, excellent (or low, medium, high, or a numeric value or grade). For example, if the quality of the optical ink 260 is low, or the status information indicates a number of network packet errors, framing error, bit error, or bit error rate that is greater than or equal to a threshold, the device 205 or device 255 can determine to increase the transmission output level. The increased transmission output level may be responsive to a change in an environmental parameter of the free-space, such as a turbidity of the water, or distance between the devices 255.

The link manager agent 220 can determine a distance between the first device 205 and the second device 255. The link manager agent 220 can determine the distance based on a phase error or phase shift in one or more optical signals encoded with a repetitive signal. For example, the device 205 can encode a repetitive signal in the transmitted data that is returned back the device 205 via device 255. The device 205 can measure the phase error to the source to determine the two-way propagation time. The system can determine the distance using the two-way propagation time and the speed of the signal (e.g., speed of light in free space). The device 205 can use the distance between a transmitter 210 of the first device 205 and receiver 215 of the second device 255 that receives the signal transmitted by the transmitter 210 of the first device 205 to control transmit levels and determine various parameters or limits.

Figure 3:
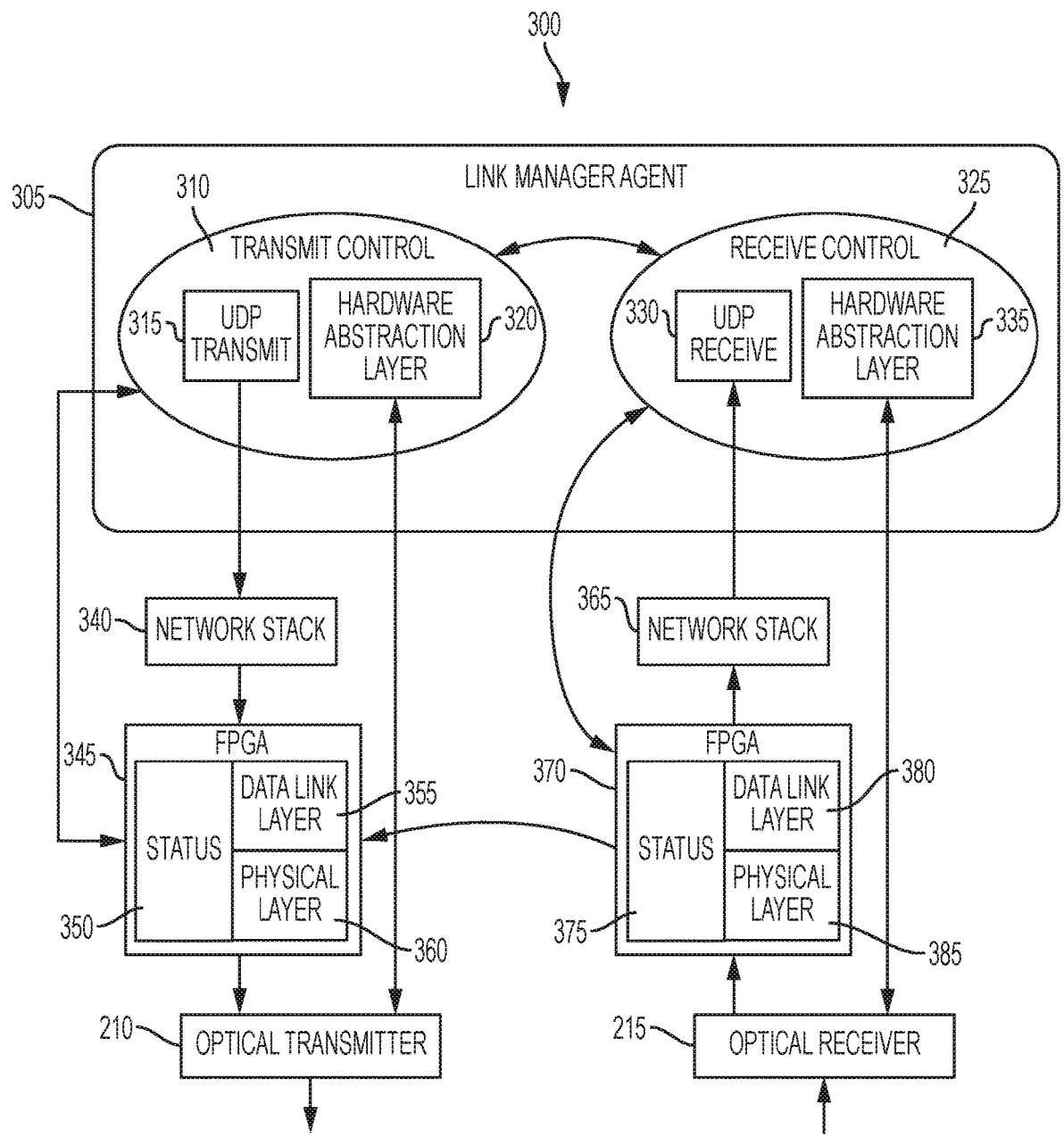
FIG. 3 is an embodiment of a system to manage an optical communication link in free-space.

FIG. 3 is an embodiment of a system to manage an optical communication link in free-space. The system 300 can establish the optical communications link, maintain the optical communications link, and provide automatic gain control for a receiver 215. The system 300 can include one or more component, element or functionality of system 200. The system 300 can include a link manager agent 305. The link manager agent 305 can include one or more component or functionality of link manager agent 220. The link manager agent 305 can include or be configured with a transmit control component 310 and a receive control component 325. The transmit control component 310 can communicate or interact with the receive control component 325. The transmit control component 310 can include a UDP transmit component 315 and a hardware layer 320. The UDP transmit component 315 can be designed and constructed to transmit data packets using the UDP network protocol. The UDP Transmit module 315 gathers status information about the various states of the local transmitter 210 and local receiver 215. These statuses can include, for example, optical output level, optical receive quality, frame errors received, bit errors received, link locked, or other status. The status can then be formed into a UDP packet to be sent the network stack 340 and then transmitted to the paired link manager agent 305 in the second device 255.

The hardware layer 320 can refer to a layer that interfaces with the optical transmitter 210. The hardware layer 320 can be configured to transmit electronic signals or instructions to the optical transmitter 210. The hardware layer 320 can perform a function of link management, such as establishing the link or maintaining the established link. The hardware abstraction layer 320 can refer to layer of programming that allows the link manager agent 305 to interact with a hardware device (e.g., optical transmitter 210) at a general or abstract level rather than at a detailed hardware level. The hardware abstraction layer 320 allows the link manager agent 310 to gather information about the function of the optical transmitter 210. This information can include, for example, optical output level, output state such as on or off, transmit quality, or other information. Additionally, the hardware abstraction layer 320 allows the link manager agent 310 to control the optical transmitter 210 for the purpose of establishing and or maintain the link 260.

The receive control component 325 can include a UDP receive component 330 and a hardware layer 335. The UDP receive component 330 can be designed and constructed to receive or process data packets formed using the UDP network protocol. The hardware layer 335 can be configured to receive electronic signals or instructions from the optical receiver 215. The hardware layer 335 can perform a function of link management, such as establishing the link or maintaining the established link. The hardware abstraction layer 335 can refer to layer of programming that allows the link manager agent 305 to interact with a hardware device (e.g., optical receiver 215) at a general or abstract level rather than at a detailed hardware level.

The UDP transmit component 315 and the UDP receive component 330 can include or communicate with or via respective network stacks 340 or 365, field programmable gate array (FPGA) devices 345 or 370, status 350 or 375, data link layer 355 or 380, or physical layers 360 or 385. The transmit control component 310 can control, manage, or otherwise communicate with an optical transmitter 210. The receive control component 325 can control, manage, or otherwise communicate with an optical receiver 215.

The network stacks 340 and 365 can refer to a protocol stack, such as a computer networking protocol suite. The network stack 340 or 365 can include a software implementation of the definition of the protocols. The network stack 340 or 365 can be divided into different protocols (e.g., HTTP, TCP, IP, Ethernet, or IEEE 802.eu) or different layers (e.g., application layer, transport layer, internet/network layer, data link/link layer, or physical layer). The network stack 340 and 365 refer to a combination of hardware and software that implements Ethernet network protocols (e.g., TCP, IP, or UDP). The network stack 340 can implement the transmit side of the network used on link 260 and network stack 365 can implement the receive side of the network used on link 260. Network stack 340 transforms data from the transmit control 310 of the link manager agent 305 and into the requested packet type (e.g., UDP or TCP/IP) for transmission on link 260. Network stack 365 can receive data packets in a standard form (e.g., UDP or TCP/IP) and deliver it to the receive control 325 of link manager agent 305.

The data link layer 355 or 380 can refer to a second layer of the seven-layer OSI model of computer networking, or the network stack 340 or 365. The data link layer 355 can include the protocol layer that transfers data between adjacent network nodes in a network, such as a wide area network (WAN) or between nodes on the same local area network (LAN) segment. The data link layer 355 or 380 can provide the functional and procedural techniques to transfer data between network entities, as well as detect and possibly correct errors that may occur in the physical layer 360 or 385.

The data link layer 355 and 380 can refer to a combination of hardware and software that implements data encoding for transmission on link 260 as well as data buffering between network stack 340 and 365 and physical layer 360 and 385. Data link layer 355 buffers data packets from network stack 340 to allow for the necessary rate conversion between the interface at the FPGA 345 and the desired signaling rate on link 260. Additionally, data link layer 355 encodes the data from network stack 340 for transmission on link 260. The encoding can include, for example, 8B/10B, 4B/5B, Manchester, phase-shift keying, or other encodings. Data link layer 380 receives data from physical layer 385 and decodes the data before sending it to network stack 365. Data link layer 380 can provide status about decoding errors, framing errors, etc. to FPGA 370. In some implementations, data link layer 355 and 380 can use one or more FPGAs 345 and 370 to implement the functions of the respective layers.

The physical layer 360 or 385 can refer to a physical layer in the Open Systems Interconnection ("OSI") model. The physical layer 360 or 385 can interact with actual hardware (e.g., optical transmitter 210 or optical receiver 215) and signaling mechanism. Physical layer 360 or 385 can provide physical connectivity of two different stations. The physical layer 360 or 385 can defines the hardware equipment, cabling, wiring, frequencies, pulses used to represent binary signals, for example. The physical layer 360 or 385 can provides its services to the data-link layer 355 or 380, respectively. The data-link layers 355 or 380 can hand over frames to the physical layer 360 or 385. Physical layer 360 or 385 can convert them to electrical pulses, which represent binary data. The binary data can be sent over a wired or wireless media. For example, the physical layer 360 can convert binary data from the data link layer 355 to an electrical or optical signal for transmission by the optical transmitter 210. In another example, physical layer 385 can convert an optical or electrical signal received from optical receiver 215 to a binary signal to be provided to the data link layer 380.

The physical layer 360 and 385 can refer to a combination of hardware and software that implements the data frame rate and transforms that data between a parallel form and a serial form for transmission on the link 260. Physical Layer 360 takes data from data link layer 355 and converts it from a parallel form to a serial form for transmission on link 260. Additionally, physical layer 360 maintains the required idle patterns when there is no data to be sent. This idle pattern is designed to keep the paired transmitter and receiver on link 260 clock locked and can be used to determine low level status of the link. Physical layer 385 converts received data from link 260 from a serial form to a parallel form and sends it to data link layer 380. Physical layer 385 can recover the clock rate from the data modulation that is necessary to both decode the received bits correctly and establish the proper frame rate alignment for transforming the data from its received serial form to a parallel form. In some implementations, the physical layer 360 and 385 can use one or more FPGAs 345 and 370 to implement the functions of the respective layers.

The status 350 and 375 can provide feedback on the function of data link layer 355 and 380 as well as physical layer 360 and 385. This status information can be available to link manager agent 305 and can be used in establishing and then maintaining the link 260. Some or all of the status 375 can be passed from FPGA 370 to FPGA 345 and then transmitted over link 260 as low level information of establishing link 260.

The link manager agent 305 can perform receiver automatic gain control. The link manager agent 305 can perform receiver automatic gain control by adjusting a parameter of the optical receiver 215 to an optimum or improved condition based on, or in response to, the amount or level of an incoming optical signal. For example, the link manager agent 305 can servo the receiver to an optimum condition given the amount of incoming optical signal. The link manager agent 305 can servo the receiver continuously or based on a time interval (e.g., 1 second, 10 seconds, 30 seconds, 1 minute, 5 minutes, 1 millisecond, or a sample period). The link manager agent 305 can perform receiver automatic gain control through the evaluation of the current control setting and the measurements of both the AC and DC components of the incoming signal. The algorithm can evaluate the measurements and change the control setting appropriately. The link manager agent 305 can provide a signal quality indication to a higher link management layer that indicates whether or if the signal is high (e.g., a signal level that can damage a component of the receiver, distorts the information or signal, or is above a threshold) or the signal level is low (e.g., a signal level that is too low for the receiver to detect or distorts the information or signal), or if the signal level is within acceptable levels. The receiver automatic gain control technique can perform error recovery functionality to handle the tripping of the overdrive protection circuit and return to normal operation.

The link manager agent 305 or system 300 can establish an optical communications link in free space. Establishing the link may differ from maintaining the link because when establishing the link, information may not be sent (or successfully parsed or received) between the two link manager agents to control the link. To establish the link, the link manager agent 305 can use a half-duplex technique and the use of one or more techniques on both sides of the link.

The system 300 can perform a transmitter optical output variation technique. For example, when initiating a link between two devices such as 205 and 255, the link manager agents 305 or 220 of the respective devices can startup or initialize their respective optical transmitters 210 at a first output (e.g., a low or lowest output level) and incrementally transition their outputs following a triangle wave pattern. This variation technique can stop, terminate, or complete responsive to or upon receiving a successful UDP packet from the paired linked manager agents. Responsive to receiving the UDP packet, the link manager agents 305 can transition from link initiation to link maintenance. For example, reception of the UDP packet can signal the transition from link initiation to link maintenance.

The system 300 can include, be configured with, or perform a transmitter out-of-band optical receive acknowledgement technique. The transmitter out-of-band optical receive acknowledgment technique can include a half-duplex communication technique designed to signal the transmitting agent (e.g., link manager agent 305) that the output transmission has reached a normal or predetermined operating point. The signal can cause or instruct the link manager agent 305 to disable its output transmitter for a half-second (or other fraction of a second or time interval) when its receiver signals that it sees an acceptable signal level. This half-duplex signaling technique can allow for adaptive changes in the output level controls prior to being able to receive the UDP packet that signals the completion of link initiation. Disable can refer to turning the output transmitter off, putting the output transmitter in a standby or low-power mode, disengaging the output transmitter, or temporarily disabling (e.g., for a time period or in a manner that allows the output transmitter to be enabled or turned on) the output transmitter.

The system 300 can include, be configured with, or perform a technique based on a transmitter data link layer. For example, instead of or in addition to using the transmitter output levels, the system can use the transmitting data during the link initiation phase to create a half-duplex communication to the receiving agent. By embedding status data about the state of the received signal in the output signal pattern, the system 300 can determine the quality of the paired transmitter. The system can use this information to adjust the paired transmitter. Once both transmitter/receiver pairs have reached a normal or predetermined operation condition, the link initiation process can complete, and the link manger agents 305 can communicate directly with one another to maintain the link (e.g., link 260 depicted in FIG. 2).

The system 300 can include, be configured with, or perform a technique using or based on a receiver data link layer. The system can maintain an established link by sending information over the link between the link management agents.

The system can use optical status packets to maintain the link 260. For example, the link manager agents 305 can use a UDP packet to communicate with each other since UDP may not require acknowledgment of proper receipt. These packets can contain status information about one or both the local transmitter and local receiver. This information can be used to guide the control techniques of the link management agents and maintain a predetermined or link quality that facilitates communication of information. The information included in the packet can include, for example: receiver AGC quality value, receiver and transmitter control settings, receiver clock lock, framing errors received (i.e. bit errors), network packet errors received, or distance measurement.

Figure 4:
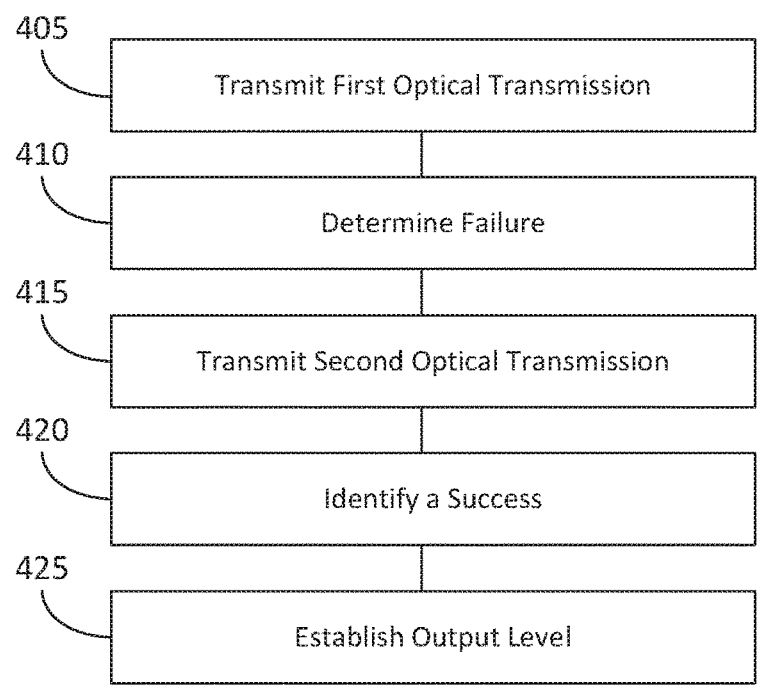
FIG. 4 depicts a method for managing an optical communication link in free-space.

FIG. 4 depicts a method for managing an optical communication link in free-space. The method 400 can be performed by one or more component or element of system 200, system 300 or system 500. At 405, a first device transmits a first optical transmission. For example, a link manager agent of the first device can instruct an optical transmitter of the first device to transmit a first optical transmission at a first output level. The first output level can be an output intensity level for light. The first device can transmit the optical transmission towards a second device, or to a second link manager agent of the second device. The optical transmission can include, be encoded with, or otherwise carry information such as a bit, byte, frame, packet, data packet, or network packet.

At 410, the first device can determine a failure. For example, the first device can determine that the second link manager agent of the second device failed to receive the first packet via the first optical transmission. The first device can determine the failure based on a parameter or characteristic associated with one or more optical transmissions received by the first device subsequent to the first device transmitting the first optical transmissions.

At 415, the first device can transmit a second optical transmission. The first device can transmit the second optical transmission responsive to failure of the first optical transmission. The first device can transmit the second optical transmission responsive to determining that a data packet of the first optical transmission was not successfully received by the second device. The first device can transmit the second optical transmission at a second output level greater than or less than the first output level used to transmit the first optical transmission. The second optical transmission can include a second packet corresponding to the network protocol.

At 420, the first device can identify a success. The first device can identify that the second packet was successfully received by the second link manager agent. The first device can determine that the second device successfully received one or more data packets in the second optical transmission based on the first device receiving a third optical transmission having a predetermined parameter or characteristic subsequent to the second optical transmission.

The first device can identify that the second packet was successfully received by the second device prior to the first device successfully receiving one or more data packets via one or more optical transmissions from the second device. Thus, the first device can use a half-duplex communication technique to identify that the second packet was successfully received by the second device.

At 425, the first device can establish an output level. For example, the first device can establish a transmission output level that corresponds to the second output level used to for the second optical transmission that was successfully received by the second device. The first device can establish the transmission output level responsive to the identification that the second packet was successfully received.

The system can maintain the optical link that has been established between two devices. After the optical link has been established with a first output level, the system can send subsequent optical transmissions, determine a quality of the optical link, and adjust the output level used for optical transmissions over the optical link if one or more data packets are not successfully received. For example, a first link manager agent of a device can identify an optical link established with a first output level between the device and a second link manager agent of a seismic data acquisition device. The first link manager agent can transmit, to the second link manager agent of the seismic data acquisition device, a first optical transmission at a first output level. The first optical transmission can include a first packet corresponding to a network protocol. The first link manager agent can determine that the second link manager agent failed to receive the first packet via the first optical transmission. For example, the second link manager agent may not provide an indication or transmission in response to receiving the packet because the second link manager did not successfully receive the packet, where successful receipt can include successfully parsing the packet to identify a payload or header of the packet.

Responsive to failure of the first optical transmission, the first link manager agent can transmit a second optical signal at a second output level greater than the first output level. The second optical transmission can include a second packet corresponding to the network protocol. The first link manager agent can identify that the second packet was successfully received by the second link manager agent. The first link manager agent can adjust, responsive to a determination of successful receipt of the second packet, the optical link to use the second output level for optical transmissions between the device and the seismic data acquisition device.

One or both of the link manager can provide to the other link manager status data. For example, the second link manager can provide status data to the first link manager agent. The status data can be included in a third optical transmission to the first link manager agent. The status data can be used to maintain a level of quality of the optical link. For example, if the status data indicates a low quality level (e.g., below a threshold), then the output level can be adjusted. If the status data indicates a high quality level above a threshold, then the output level can be lowered. The output level can be lowered responsive to the high quality level above the threshold, which can reduce battery usage or consumption. The status data can include at least one of an automatic gain control value, receiver control setting, transmitter control setting, receiver clock lock, framing error, bit error, bit error rate, network packet errors received, distance measurement, or packet retries. The second link manager agent can adjust the output level of an optical transmitter of the seismic data acquisition device based on the level of quality of the optical link.

Figure 5:
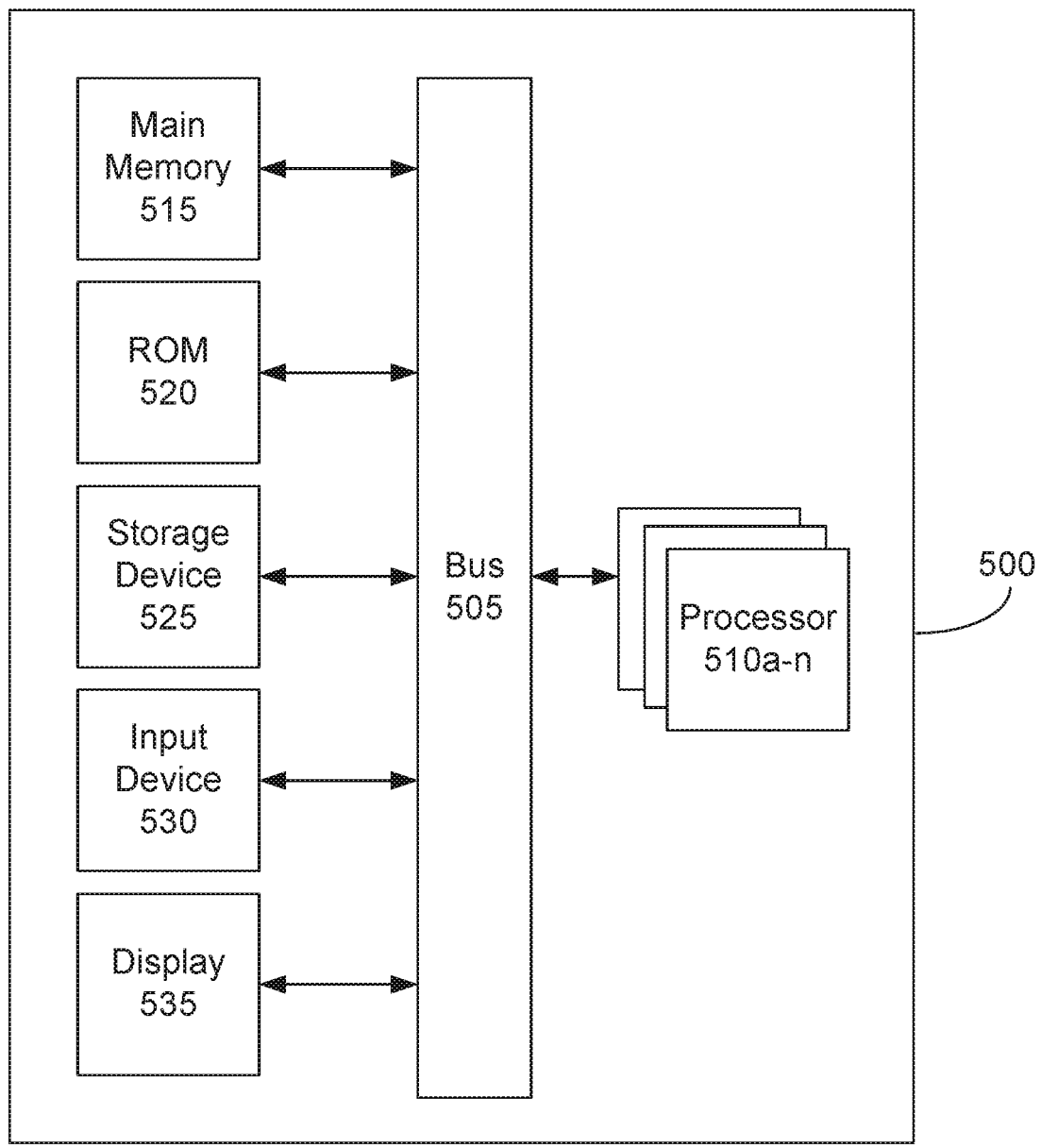
FIG. 5 depicts a block diagram of an architecture for a computing system employed to implement various elements of the system depicted in FIGS. 1, 2 and 3, and perform the method depicted in FIG. 4.

FIG. 5 is a block diagram of a computer system 500 in accordance with an embodiment. The computer system or computing device 500 can be used to implement one or more component of system 200 or system 300, or element of method 400. The computing system 500 includes a bus 505 or other communication component for communicating information and a processor 510a-n or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing seismic data, binning function data, images, reports, tuning parameters, executable code, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535 or display device, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In some embodiments, hard-wired circuitry may be used in place of or in combination with software instructions to effect illustrative implementations. Thus, embodiments are not limited to any specific combination of hardware circuitry and software.

Although an example computing system has been described in FIG. 5, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, implementations can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various implementations can be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Where technical features in the drawings, detailed description or any claim are followed by reference identifiers, the reference signs have been included to increase the intelligibility of the drawings, detailed description, and claims. Accordingly, neither the reference identifiers nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to manage an optical link in free-space to communicate data via an aqueous medium, comprising:
   a first link manager agent of an underwater vehicle;
   a seismic data acquisition unit positioned on a seabed in the aqueous medium, the seismic data acquisition unit comprising:
      one or more sensors to detect acoustic waves;
      a seismic data recorder; and
      a first link manager agent of the seismic data acquisition unit to:
         determine, based on receipt by the underwater vehicle of one or more optical transmissions from the seismic data acquisition unit at a predetermined time interval, that the first link manager agent of the underwater vehicle failed to receive a first data packet via a first optical transmission, wherein the first link manager agent of the seismic data acquisition unit fails to receive one or more data packets of the one or more optical transmissions;
         determine a distance between the seismic data acquisition unit and the underwater vehicle based on a phase error in one or more optical signals encoded with a repetitive signal; and
         transmit a second optical transmission at a second output level different than a first output level over the distance between the seismic data acquisition unit and the underwater vehicle;
   the first link manager agent of the seismic data acquisition unit and the first link manager agent of the underwater vehicle configured to establish an optical link between the seismic data acquisition unit and the underwater vehicle; and
   the first link manager agent of the seismic data acquisition unit configured to provide, for inclusion in a third optical transmission, status data comprising packet retries and used to maintain a level of quality of the optical link.

2. The system of claim 1, comprising:
   the first link manager agent of the seismic data acquisition unit to:
      identify that a second data packet from the second optical transmission was successfully received by the first link manager agent; and
      establish the second output level as a transmission output level for the seismic data acquisition unit.

3. The system of claim 1, comprising:
   the first link manager agent of the seismic data acquisition unit to:
   identify that a second data packet from the second optical transmission was successfully received by the first link manager agent.

4. The system of claim 1, comprising:
   the first link manager agent of the underwater vehicle configured to:
      transmit to the first link manager agent of the seismic data acquisition unit, the third optical transmission at a third output level, the third optical transmission comprising a third data packet;
      determine that the first link manager agent of the seismic data acquisition unit failed to receive the third data packet via the third optical transmission;
      transmit, responsive to failure of the third optical transmission, a fourth optical transmission at a fourth output level different than the third output level, the fourth optical transmission comprising a fourth data packet;
      identify that the fourth data packet was successfully received by the first link manager agent of the seismic data acquisition unit; and
      establish responsive to a determination of successful receipt of a second data packet and the fourth data packet, the optical link between the seismic data acquisition unit and the underwater vehicle.

5. The system of claim 1, comprising:
   the first link manager agent of the seismic data acquisition unit configured to
      receive, from the first link manager agent of the underwater vehicle, a default optical transmission; and
      transmit, responsive to receipt of the default optical transmission, to the first link manager agent of the underwater vehicle, the first optical transmission at the first output level.

6. The system of claim 1, comprising:
   the first link manager agent of the underwater vehicle configured to:
      transmit to the first link manager agent of the underwater vehicle, the first optical transmission at the first output level, the first optical transmission comprising the first data packet;
      receive one or more additional default transmissions from the underwater vehicle having a same parameter as a default optical transmission previously received from the underwater vehicle; and disable an optical transmitter of the seismic data acquisition unit responsive to a determination that the first link manager agent of the underwater vehicle successfully received a second data packet.

7. The system of claim 1, comprising:
an automatic gain control unit of the seismic data acquisition unit to increase a gain level based on a measurement of at least one of an alternating current component or direct current component of one or more optical transmissions received by the seismic data acquisition unit; and
an overdrive protection system of the seismic data acquisition unit to detect a signal level greater than or equal to a threshold and, responsive to detection of the signal level greater than or equal to the threshold, turn off a receiver of the seismic data acquisition unit.

8. The system of claim 1, comprising:
the first link manager agent of the underwater vehicle configured to adjust an output level of an optical transmitter of the seismic data acquisition unit based on the level of quality of the optical link.

9. The system of claim 1, comprising:
the first link manager agent of the seismic data acquisition unit configured to:
 determine that the first link manager agent of the underwater vehicle failed to receive the first data packet via the first optical transmission based on receipt by the seismic data acquisition unit of a first one or more optical transmissions from the seismic data acquisition unit at a first predetermined time interval; and
 identify that a second data packet was successfully received by the first link manager agent of the underwater vehicle based on receipt by the underwater vehicle of a second one or more optical transmissions from the seismic data acquisition unit at a second predetermined time interval.

10. The system of claim 1, comprising:
the first link manager agent of the seismic data acquisition unit configured to determine that the first link manager agent of the underwater vehicle failed to receive the first data packet via the first optical transmission based on receipt by the underwater vehicle of one or more optical transmissions from the seismic data acquisition unit at a predetermined time interval, wherein the first link manager agent of the seismic data acquisition unit fails to receive one or more data packets of the one or more optical transmissions.

11. The system of claim 1, comprising:
the first link manager agent of the seismic data acquisition unit configured to use a half-duplex communication technique to identify that a second data packet was successfully received by the first link manager agent of the underwater vehicle.

12. A method of managing an optical link to communicate data via an aqueous medium, comprising:
 providing a first link manager agent of an underwater vehicle;
 providing a seismic data acquisition unit on a seabed in the aqueous medium, the seismic data acquisition unit comprising one or more sensor to detect acoustic waves, and a seismic data recorder to record seismic data corresponding to the acoustic waves detected by one or more sensors;
 determining, by the first link manager agent of the seismic data acquisition unit based on receipt by the underwater vehicle of one or more optical transmissions from the seismic data acquisition unit at a predetermined time interval, that the first link manager agent of the underwater vehicle failed to receive a first data packet via a first optical transmission, wherein the first link manager agent of the seismic data acquisition unit fails to receive one or more data packets of the one or more optical transmissions;
 determining a distance between the seismic data acquisition unit and the underwater vehicle based on a phase error in one or more optical signals encoded with a repetitive signal;
 transmitting, by the first link manager agent of the seismic data acquisition unit, a second optical transmission at a second output level different than a first output level over the distance between the seismic data acquisition unit and the underwater vehicle;
 establish, by the first link manager agent of the seismic data acquisition unit and the first link manager agent of the underwater vehicle, the optical link between the seismic data acquisition unit and the underwater vehicle; and
 providing, by the first link manager agent of the underwater vehicle, for inclusion in a third optical transmission to the first link manager agent, status data comprising packet retries and used to maintain a level of quality of the optical link.

13. The method of claim 12, comprising:
identifying, by the first link manager agent of the seismic data acquisition unit, that a second data packet from the second optical transmission was successfully received by the first link manager agent of the underwater vehicle; and
establishing, by the first link manager agent of the seismic data acquisition unit, the second output level as a transmission output level for the seismic data acquisition unit.

14. The method of claim 12, comprising:
identifying, by the first link manager agent of the seismic data acquisition unit, that a second data packet was successfully received by the first link manager agent of the underwater vehicle prior to the first link manager agent of the seismic data acquisition unit successfully receiving one or more data packets via one or more optical transmission from the first link manager agent of the underwater vehicle.

15. The method of claim 12, comprising:
using a half-duplex communication technique to identify that a second data packet was successfully received by the first link manager agent of the underwater vehicle.

16. The method of claim 12, wherein:
the status data comprises at least one of an automatic gain control value, receiver control setting, transmitter control setting, receiver clock lock, framing error, bit error, bit error rate, network packet errors received, or distance measurement; and
adjusting, by the first link manager agent of the underwater vehicle, output level of an optical transmitter of the underwater vehicle based on the level of quality of the optical link.

17. The method of claim 12, comprising:
receiving, by a first link manager agent of the seismic data acquisition unit, from the first link manager agent of the underwater vehicle, a default optical transmission;
transmitting, by the first link manager agent of the seismic data acquisition unit, to the first link manager agent of the underwater vehicle, the first optical transmission at the first output level, the first optical transmission comprising the first data packet;

transmitting, by the first link manager agent of the seismic data acquisition unit responsive to receipt of the default optical transmission through the aqueous medium, the first optical transmission at the first output level; and receiving, by the first link manager agent of the seismic data acquisition unit, one or more additional default transmissions from the underwater vehicle having a same parameter as the default optical transmission previously received from the underwater vehicle.

18. The method of claim 12, comprising:

turning off, by the first link manager agent of the underwater vehicle, an optical transmitter of the underwater vehicle responsive to determining that the first link manager agent of the underwater vehicle successfully received a second data packet, the first link manager agent of the underwater vehicle disabling the optical transmitter to indicate to the first link manager agent of the seismic data acquisition unit that the first link manager agent of the underwater vehicle successfully received the second data packet.

* * * * *